United States Patent [19]
Suzuki et al.

[11] Patent Number: 5,742,704
[45] Date of Patent: Apr. 21, 1998

[54] IMAGE CODING APPARATUS CAPABLE OF CODING IN ACCORDANCE WITH AN IMAGE TYPE

[75] Inventors: Kazuhiro Suzuki; Yutaka Koshi; Koh Kamizawa, all of Kanagawa, Japan

[73] Assignee: Fuji Xerox Co., Ltd., Tokyo, Japan

[21] Appl. No.: 779,390

[22] Filed: Jan. 7, 1997

Related U.S. Application Data

[63] Continuation of Ser. No. 542,804, Oct. 13, 1995, abandoned, which is a continuation of Ser. No. 235,657, Apr. 29, 1994, abandoned.

[30] Foreign Application Priority Data

Apr. 30, 1993 [JP] Japan ................................. 5-128297

[51] Int. Cl.$^6$ ................................................. G06K 9/34
[52] U.S. Cl. ........................ 382/176; 382/170; 382/171; 382/232; 358/453; 358/462; 348/438
[58] Field of Search ....................... 382/173, 232, 382/170, 171, 176, 245, 246; 358/455, 462, 453; 348/438

[56] References Cited

U.S. PATENT DOCUMENTS

| | | | |
|---|---|---|---|
| 4,447,829 | 5/1984 | Schayes et al. | 358/260 |
| 5,016,118 | 5/1991 | Nannichi | 358/462 |
| 5,121,216 | 6/1992 | Chen et al. | 382/56 |
| 5,138,668 | 8/1992 | Abe | 382/9 |
| 5,150,432 | 9/1992 | Ueono et al. | 382/56 |
| 5,267,333 | 11/1993 | Aono et al. | 382/56 |
| 5,291,309 | 3/1994 | Semasa | 358/455 |

FOREIGN PATENT DOCUMENTS

63-306768  12/1994  Japan ............................. H04N 1/41

*Primary Examiner*—Jose L. Couso
*Assistant Examiner*—Anh Hong Do
*Attorney, Agent, or Firm*—Finnegan, Henderson, Farabow, Garrett & Dunner, L.L.P.

[57] ABSTRACT

A one-block extracting section extracts a pixel block from an input image signal. An area judging section calculates characteristic quantities such as variance information, histogram information and dynamic range information, and judges whether the pixel block is photographic or text-like based on the characteristic quantities. A photographic pixel block is coded by a transform coding section, and a text-like pixel block is coded by a block truncation coding section.

7 Claims, 9 Drawing Sheets

REPRESENTATIVE GRADATION LEVEL (1) = A

REPRESENTATIVE GRADATION LEVEL (0) = B

+

RESOLUTION INF.          DECODED IMAGE

FIG. 7B

| CODING IDENTI-FIER | REPRESENTATIVE GRADATION LEVEL (1) | REPRESENTATIVE GRADATION LEVEL (0) | RESOLUTION INF. |
|---|---|---|---|
| 1 BIT | 7 BITS | 8 BITS | 64 BITS |

← 80 BITS →

FIG. 8A

|   | 0 |   |   |   |   |   |   | 7 |
|---|---|---|---|---|---|---|---|---|
| 0 | 8 | 7 | 6 | 5 | 4 | 0 | 0 | 0 |
|   | 7 | 6 | 5 | 4 | 0 | 0 | 0 | 0 |
|   | 6 | 5 | 3 | 0 | 0 | 0 | 0 | 0 |
|   | 5 | 4 | 0 | 0 | 0 | 0 | 0 | 0 |
|   | 4 | 0 | 0 | 0 | 0 | 0 | 0 | 0 |
|   | 0 | 0 | 0 | 0 | 0 | 0 | 0 | 0 |
|   | 0 | 0 | 0 | 0 | 0 | 0 | 0 | 0 |
| 7 | 0 | 0 | 0 | 0 | 0 | 0 | 0 | 0 |

CODING IDENTIFIER | DC COEFFICIENT (0,0) 8 BITS | AC COEFFICIENT (0,1) 7 BITS | AC COEFFICIENT (1,0) 7 BITS | AC COEFFICIENT (2,0) 6 BITS | AC COEFFICIENT (1,1) 6 BITS | AC COEFFICIENT (0,4) 4 BITS

1 BIT

← 80 BITS →

IMAGE CODING APPARATUS CAPABLE OF CODING IN ACCORDANCE WITH AN IMAGE TYPE

This application is a continuation of application Ser. No. 08/542,804, filed Oct. 13, 1995, now abandoned, and Ser. No. 08/235,657, filed Apr. 29, 1994, now abandoned.

BACKGROUND OF THE INVENTION

The present invention relates to a coding apparatus of an image signal.

Various image coding techniques are now being investigated to efficiently transmit and store high-resolution color images. Among those coding techniques are transform coding methods, which are represented by, for instance, a method based on the discrete cosine transform (DCT). In the transform coding method, coding is performed based on the fact that when subjected to the orthogonal transform most of signal power of a natural image such as a portrait image and a landscape image is concentrated on low-frequency coefficients, because such an image has a high autocorrelation of pixel values. However, if the transform coding method is applied to an image, such as a text image, containing many edges, in which case signal power extends to high-frequency coefficients, image quality may deteriorate due to a reduction of coding efficiency and discard of high-frequency coefficients.

On the other hand, in the block truncation coding (BTC) method, each pixel block is approximated by using a plurality of representative gradation values and resolution information indicating how individual pixels are replaced by the representative gradation values. Although the block truncation coding method is superior in edge reproduction performance, it is inferior to the transform coding method in gradation reproduction performance.

Figure 17:
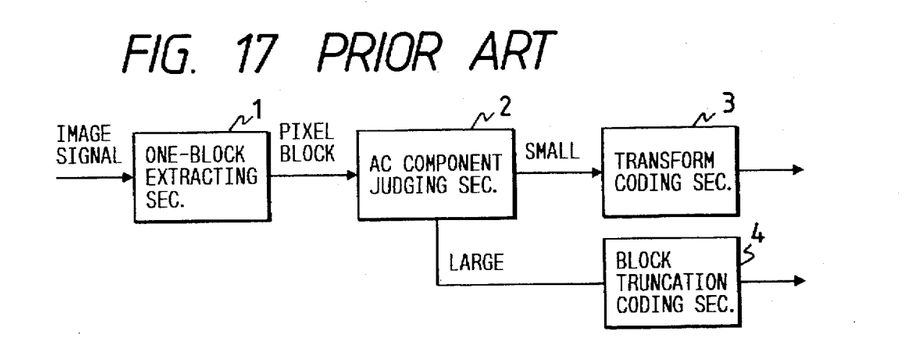
FIG. 17 is a block diagram showing a conventional image coding apparatus.

Among known techniques to solve the above problems is an image coding method disclosed in Japanese Patent Application Unexamined Publication No. 63-306768. FIG. 17 shows a configuration of an image coding apparatus of this publication. In FIG. 17, reference numeral 1 denotes a one-block extracting section; 2, an AC component judging section; 3, a transform coding section; and 4, a block truncation coding section. The one-block extracting section 1 extracts, from an input image signal, a pixel block that is a rectangular area consisting of a plurality of pixels. The AC component judging section 2 compares an AC power of the pixel block with a predetermined threshold, and supplies the pixel block to the transform coding section 3 if the AC power is smaller, and to the block truncation coding section 4 if it is larger. The transform coding section 3 produces coded data by transform-coding the pixel block, and the block truncation coding section 4 produces coded data by coding the pixel block by block truncation coding.

The operation of the conventional image coding apparatus of FIG. 17 will be described below. The one-block extracting section 1 extracts a pixel block from an input image signal. The AC component judging section 2 calculates an AC power, i.e., a sum of squares of AC components of the extracted pixel block, and compares the calculated AC power with a predetermined threshold $TH_{AC}$. If the AC power is smaller than $T_{AC}$ (that is, the pixel block contains only a small quantity of AC components such as noise and high-frequency signals), the pixel block is transform-coded by the transform coding section 3. If the AC power is larger than $TH_{AC}$, the pixel block is coded by the block truncation coding section 4, with a judgment that it contains a large quantity of AC components such as noise and high-frequency signals.

With the above-described constitution and operation, when a pixel block having a large quantity of AC components is reproduced after being subjected to the transform coding, it is possible to prevent contours of a reproduced image from being blurred. However, in the case of dealing with an office document containing color characters or the like, the above coding apparatus may not be able to detect edges. This is so because in contrast to the case of a black-and-white document having a sufficiently large level difference between a character color and a background color, a character color of color characters has an intermediate density and therefore there may not be obtained a sufficiently large level difference. In the case of a pixel block containing edges having a small level difference, in which a sum of squares of AC components is also small, the edge detection by the simple threshold processing cannot assure a correct judgment.

Figure 18A:
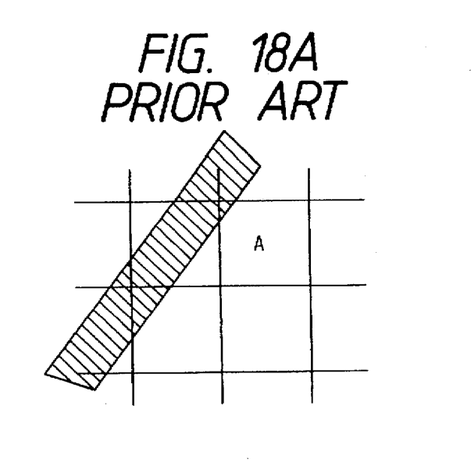
FIGS. 18A and 18B illustrate a relationship between a character edge and pixel block boundaries in the conventional image coding apparatus.
Figure 18B:
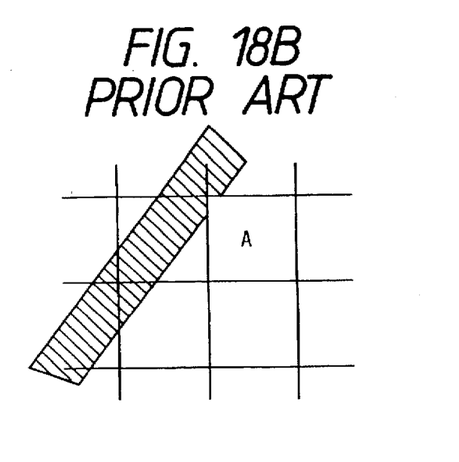

There is another problem as illustrated in FIGS. 18A and 18B. FIGS. 18A and 18B show relationships between a portion of a character and pixel block boundaries before coding and after decoding that is performed after the coding, respectively, in the conventional coding method. In the case of a pixel block that contains only a slight portion of a character edge, like pixel block A shown in FIG. 18A, the AC component power of the block is relatively small. Therefore, the threshold judgment based on the AC power in the conventional method may cause the above pixel block to be coded erroneously by the transform coding. In such a case, high-frequency coefficients of this pixel block is quantized coarsely, so that the edge is not properly reproduced in a reproduction image; that is, the contour has a missing portion as shown in FIG. 18B. This missing portion causes the reproduction image to be visually recognized as a deteriorated image.

SUMMARY OF THE INVENTION

In view of the above circumstances in the art, an object of the present invention is to provide an image coding apparatus which can properly code an image irrespective of whether it is a natural image or a text image and, in particular, can code an image in accordance with its characteristics even if it contains edges having a small level difference as in the case of a color image, or a pixel block contains only a slight portion of an edge.

According to the invention, an image coding apparatus comprises:

one-block extracting means for extracting, from an image signal, a pixel block containing m×n pixels, where m and n are positive integers;

a plurality of coding means for coding the pixel block; and area judging means for analyzing at least one characteristic quantity of the pixel block, and for supplying the pixel block to one of the plurality of coding means in accordance with a result of the analysis.

In a typical operation, the area judging means judges whether the pixel block is a text-like block which contains an edge or a photographic block which does not contain an edge based on a variance, the shape of a histogram and a dynamic range that is determined from a maximum and a minimum of pixel values of the pixel block. If the histogram has double peaks, the pixel block is judged to be a text-like image. If the histogram has a single peak and the variance is large, the pixel block is judged to be a photographic image. Where the histogram has a single peak and the variance is small, the pixel block is judged a text-like image if the dynamic range is large, and a photographic image if the dynamic range is small. A text-like pixel block is coded by, for instance, block truncation coding to preserve edges. A photographic pixel block is coded, for instance, by transform coding to preserve density gradation.

DESCRIPTION OF THE PREFERRED EMBODIMENTS

Figure 1:
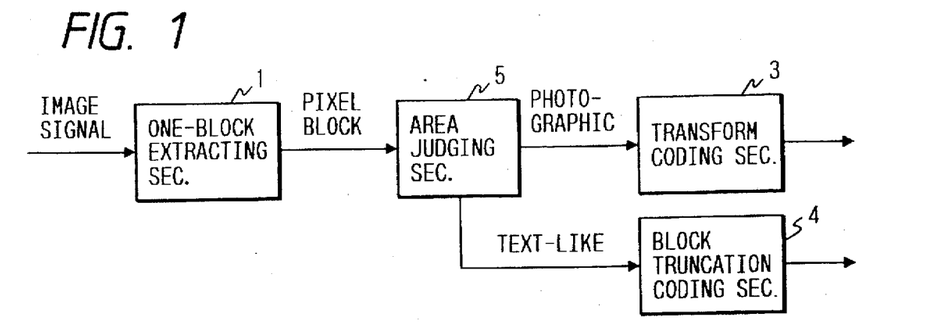
FIG. 1 is a block diagram showing an image coding apparatus according to a first embodiment of the present invention.

FIG. 1 is a block diagram showing an image coding apparatus according to a first embodiment of the present invention. The parts in FIG. 1 that are similar to the corresponding parts in FIG. 17 are given the same reference numerals and descriptions therefor will be omitted.

An area judging section 5 calculates a plurality of characteristic quantities of a pixel block, judges on a block-by-block basis whether a pixel value distribution of the block is of a photographic image that does not contain edges or of a text-like image that contains edges, and supplies a photographic pixel block to a transform coding section 3 and a text-like pixel block to the block truncation coding section 4.

Figure 2:
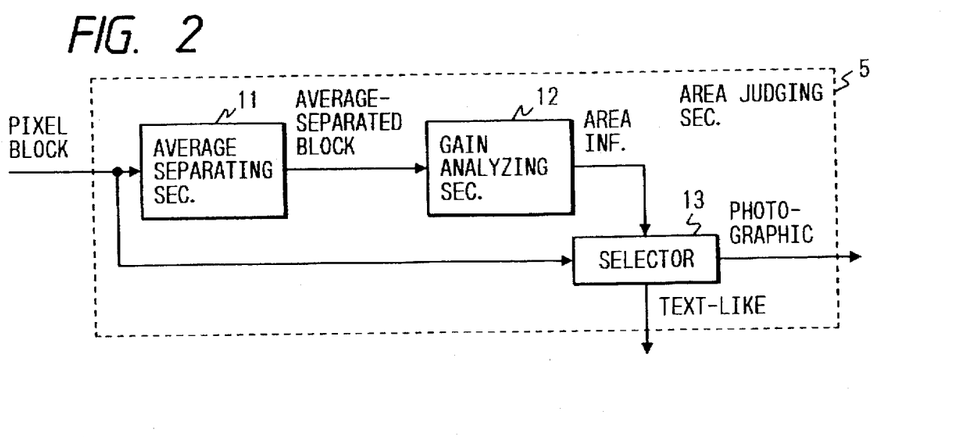
FIG. 2 is a block diagram showing an example of an area judging section.

FIG. 2 is a block diagram showing a configuration of an example of the area judging section 5. In FIG. 2, reference numeral 11 denotes an average separating section; 12, a gain analyzing section; and 13, a selector. The average separating section 11 calculates a pixel value average based on respective pixel values of an input pixel block, and produces an average-separated block by subtracting the average from the respective pixel values of the block. The gain analyzing section 12 calculates statistics including a variance, a histogram, and a maximum and minimum, judges based on the calculated statistics whether the pixel value distribution of the pixel block is photographic or text-like, and outputs area information for discrimination between the above two image types. The selector 13 switches between destinations of the pixel block based on the judgment result of the gain analyzing section 12.

Figure 3:
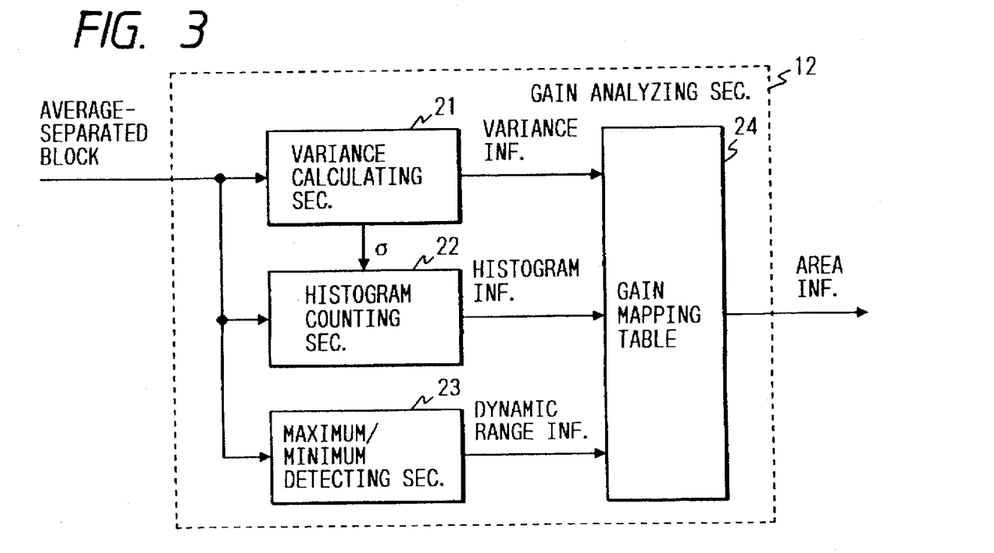
FIG. 3 is a block diagram showing an example of a gain analyzing section.

FIG. 3 is a block diagram showing a configuration of an example of the gain analyzing section 12. In FIG. 12, reference numeral 21 denotes a variance calculating section; 22, a histogram counting section; 23, a maximum/minimum detecting section; and 24, a gain mapping table. The variance calculating section 21 calculates a pixel value variance of the average-separated block, and outputs variance information. The histogram counting section 22 produces a histogram by counting pixel values of the average-separated block, and outputs histogram information. The maximum/minimum detecting section 23 detects a maximum and minimum of the pixel values of the average-separated block, and output those as dynamic range information. The gain mapping table 24 determines area information based on the variance information output from the variance calculating section 21, the histogram information output from the histogram counting section 22, and the dynamic range information output from the maximum/minimum detecting section 23.

An example of the operation of the image coding apparatus according to the first embodiment will be described below.

The one-block extracting section 1 extracts a pixel block from an input image signal, and the extracted pixel block is input to the area judging section 2. First, the average separating section 11 of FIG. 2 calculates an average $\mu$ of values $S_{ij}$ ($i=1, 2, \ldots, m$, $j=1, 2, \ldots, n$) of m×n pixels that constitute the pixel block as output from the one-block extracting section 1. Then, the average separating section 11 subtracts the average $\mu$ from the respective values of the m×n pixels, and outputs an average-separated block consisting of values $X_{ij}$ ($i=1, 2, \ldots, m$, $j=1, 2, \ldots, n$) of m×n average-separated pixels. The average $\mu$ of the pixel values $S_{ij}$ of the pixel block and the pixel values $X_{ij}$ of the average-separated block are expressed as follows:

$$\mu = \frac{\sum_{i=1}^{m} \sum_{j=1}^{n} S_{ij}}{mn}$$

$$X_{ij} = S_{ij} - \mu$$

The average-separated block as output from the average separating section 11 is input to the gain analyzing section 12. Analyzing the pixel values of the average-separated block, the gain analyzing section 12 generates, by calculations, gain information that consists of amplitudes of the pixel values and a frequency distribution of the pixel values, and a maximum and a minimum. The gain analyzing section 12 further performs an area judgment for the pixel block based on the gain information thus generated. In the analysis of the pixel values, a variance of the values of the m×n pixels constituting the average-separated block is calculated in the variance calculating section 21, a histogram is generated by counting in the histogram counting section 22, and a maximum and a minimum are detected in the maximum/minimum detecting section 23. The above gain information is input to the gain mapping table 24.

The variance calculating section 21 calculates the variance $\sigma^2$ of the values of the m×n pixels constituting the average-separated block. The variance $\sigma_2$ or $\sigma$ is calculated as follows:

$$\sigma^2 = \frac{\sum\limits_{i=1}^{m} \sum\limits_{j=1}^{n} X_{ij}^2}{mn}$$

$$\sigma = \frac{\sum\limits_{i=1}^{m} \sum\limits_{j=1}^{n} |X_{ij}|}{mn}$$

The histogram counting section 22 counts frequencies by performing threshold processing on the average-separated block using the variance $\sigma$ as calculated by the variance calculating section 21. For example, by setting thresholds at $\pm\sigma/a$, frequencies may be counted for three ranges of pixel values: pixel values smaller than $-\sigma/a$, pixel values between $-\sigma/a$ and $\sigma/a$, and pixel values larger than $\sigma/a$. The number a is a positive real number, and may be set at 3, for instance. Based on the counting operations for the three ranges, it is judged whether the histogram has a single-peak distribution or a double-peak distribution, with a judgment result serving as histogram information. The value of a and the number of counting ranges may be set as desired.

The maximum/minimum detecting section 23 detects the maximum and minimum of the values of the pixels constituting the average-separated block. Detection results are output as dynamic range information.

Figure 4A:
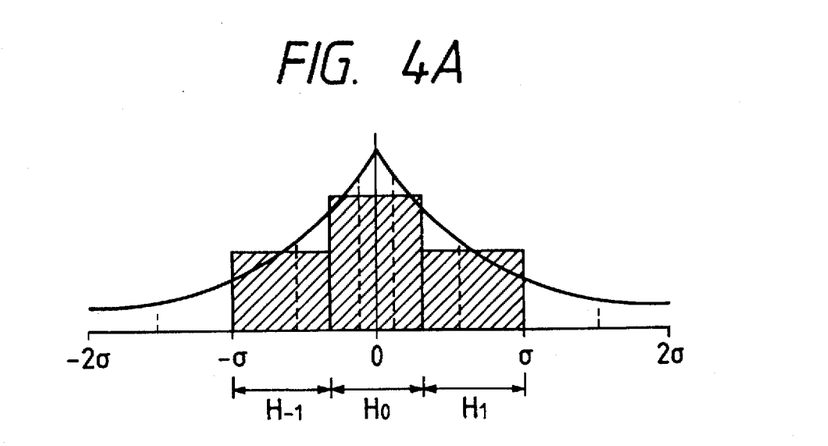
FIGS. 4A and 4B show examples of histograms produced by a histogram counting section.
Figure 4B:
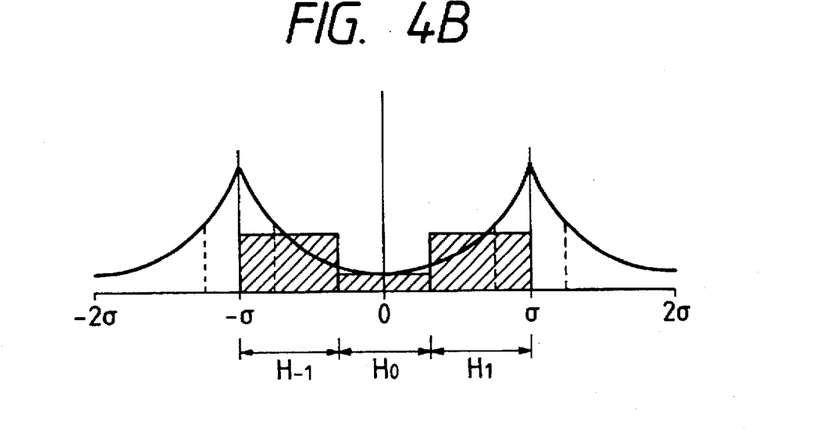

FIGS. 4A and 4B illustrate examples of histograms generated by the histogram counting section 22, in which, as described above, a is set at 3 and frequencies are counted for the three ranges. $H_{-1}$, $H_0$ and $H_1$ denote count values of pixels values smaller than $-\sigma/a$, pixel values between $-\sigma/a$ and $\sigma/a$, and pixel values larger than $\sigma/a$ t respectively. As shown in FIG. 4A, the histogram has a single-peak distribution if $H_{-1} \leq H_0$ and $H_0 \geq H_1$. If these inequalities are not satisfied, the histogram is judged as having a double-peak distribution, as in the case of the histogram shown in FIG. 4B.

In the invention, since the counting ranges of the histogram are set based on the variance $\sigma$ for each pixel block, the counting operation is performed on a normalized distribution. As a result, even for a pixel block containing an edge having a small level difference of, for instance, a color character, it can be judged correctly as having a double-peak distribution, i.e., a text-like distribution.

In general, a photographic pixel block has a smooth variation of gradation and, therefore, pixel values of the average-separated block have a single-peak distribution. On the other hand, a text-like pixel block has a double-peak distribution in which peaks appear at positions corresponding to a character color and a background color of the block. Therefore, the histogram information can be an index to be used for judging whether a pixel block is text-like or photographic.

Figure 5A:
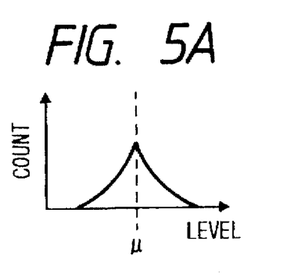
FIGS. 5A–5F show various pixel value distributions of a pixel block.
Figure 5B:
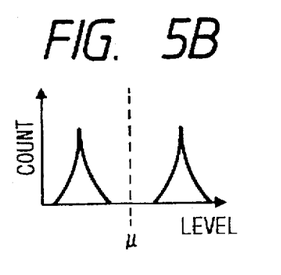
Figure 5C:
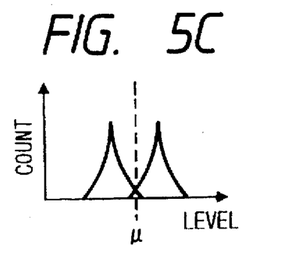
Figure 5D:
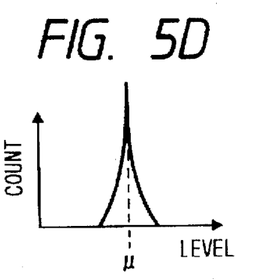
Figure 5E:
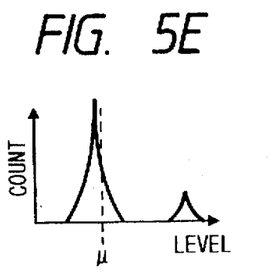
Figure 5F:
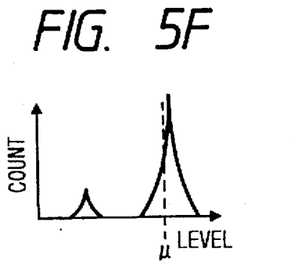

FIGS. 5A–5F illustrate various pixel value distributions of a pixel block, which are typical ones as normalized in the above manner. FIGS. 5A and 5B has a single-peak distribution, and the peak height depends on the degree of a pixel value variation within the pixel block. The distribution of FIG. 5A is of such a case that the pixel block has a variation of gradation. The distribution of FIG. 5B is of such a case that the pixel block has a very gentle variation of gradation. FIG. 5B shows a pixel value distribution of a pixel block containing an edge having a large level difference, and FIG. 5C shows a pixel value distribution of a pixel block containing an edge having a small level difference of, for instance, a color character. The distributions of FIGS. 5B and 5C have a difference in the interval of the two peaks. FIGS. 5E and 5F show distributions of cases where a pixel block contains only a slight portion of an edge. In these cases, since there exists an extremely large difference between frequencies corresponding to a character color and a background color, the distributions of FIGS. 5E and 5F are double-peak distributions. By judging which one of the above types the pixel value distribution comes under, the characteristic (photographic or text-like) of a subject pixel block image can be determined.

Figure 6:
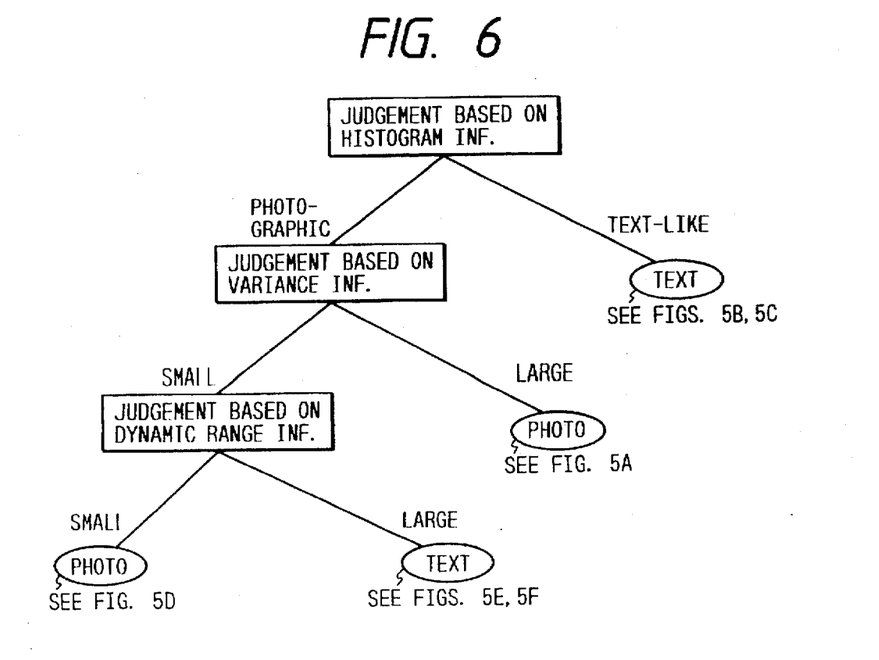
FIG. 6 is a chart illustrating how an area judgment is performed in a gain mapping table.

FIG. 6 illustrates an area judging method of the gain mapping table 24. The gain mapping table 24 receives the variance information, histogram information and dynamic range information from the variance calculating section 21, histogram counting section 22 and maximum/minimum detecting section 23, respectively. In the gain mapping table 24, the area judgment as to whether the pixel block is photographic or text-like is effected by performing threshold processing at respective nodes of a tree structure shown in FIG. 6. Other than the step-like judging method shown in FIG. 6, the gain mapping table 24 may judge by using a look-up table or an associative memory, or based on a fuzzy inference.

With the judgment tree shown in FIG. 6, it is first judged based on the histogram information whether a pixel block has a single-peak distribution or a double-peak distribution. A pixel block having a clear double-peak distribution as shown in FIG. 5B or 5C is separated at this stage as a text block. However, in the case of a text block containing only a slight portion of an edge (FIGS. 5E and 5F), an average of pixel values of the pixel block may exist close to a larger peak and, therefore, a histogram may not be judged as having double peaks. Considering this fact, a pixel block of one of the types as shown in FIGS. 5A, 5D, 5E and 5F is separated as a photographic block by the judgment based on the histogram, and is subjected to a judgment of the next stage.

As shown in FIG. 6, the second-stage judgment is performed based on the variance information. At this stage, a pixel block having a wide (i.e., large-variance), single-peak distribution as shown in FIG. 5A is separated as a photographic block. A pixel block having a distribution as shown in FIG. 5E or 5F has a relatively small variance because most of pixel values exist near a larger peak and, therefore, it is subjected to a judgment of the next stage.

As shown in FIG. 6, the third-stage judgment is performed based on the dynamic range information, to separate a pixel block having a distribution as shown in FIG. 5D from a pixel block having a distribution as shown in FIG. 5E or 5F. A pixel block having a distribution of the type shown in FIG. 5D has a very gentle variation of gradation within the block and, therefore, a difference between a maximum and a minimum is very small. On the other hand, a pixel block having a distribution of the type shown in FIG. 5E or 5F has levels corresponding to a character color and a background color and, therefore, a difference between a maximum and a minimum is relatively large. Therefore, discrimination between a distribution of the type shown in FIG. 5D and a distribution of the types shown in FIGS. 5E and 5F is effected by performing threshold judgment on the difference between the maximum and the minimum.

The judgment result of the gain mapping table 24 is input, as the area information, to the selector 13, where a destination of the pixel block is determined. The transform coding section 3 and the block truncation coding section 4 code, by the respective coding methods, the pixel block as received from the area judging section 5, and add, to coded data, discriminating information indicating the coding method applied. This will enable a later decoding operation to switch between decoding methods on a pixel block basis.

As described above, according to the invention, a plurality of statistics of each pixel block are calculated, and the judgment as to whether pixel values of the block represent a text-like image that contains edges or a photographic image that does not contain edges is performed based on the statistics thus determined. Therefore, the coding operation can be performed in accordance with the image characteristic. According to the area judging method of the invention, it is possible to correctly judge, to be a text-like block, a block containing an edge having a small level difference of, for instance, a color character and a block containing only a slight portion of an edge, and to code it properly.

Although it is somehow possible to perform a judgment as to the characteristic of a pixel block by using only one of the variance information, histogram information and dynamic range information, the judgment can be performed so as to effectively utilize the features of the three kinds of information if they are combined and used sequentially.

Next, a description will be made of an example of coding operations in the transform coding section 3 and the block truncation coding section 4, which example is directed to a control method of keeping constant a code amount of one pixel block as output from the transform coding section 3 or the block truncation coding section 4. In the following description, it is assumed that one pixel block consists of 8×8 pixels and each pixel has an 8-bit accuracy (i.e., 256 levels).

Figure 7A:
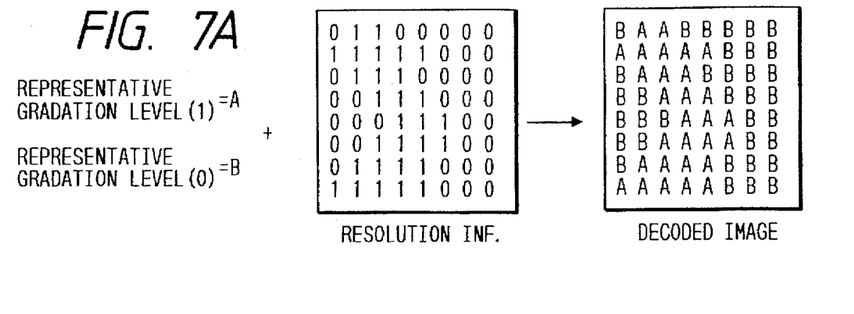
FIGS. 7A and 7B illustrate an example of block truncation coding.
Figure 7B:
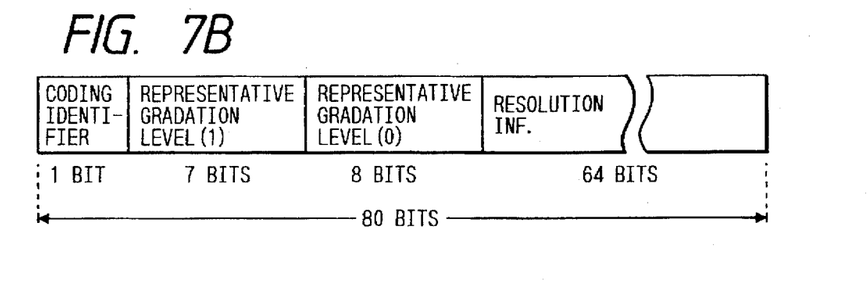

FIGS. 7A and 7B illustrate an example of the block truncation coding method. When a pixel block is subjected to two-level block truncation coding, resulting codes consist of two representative gradation levels and 1-bit resolution information indicating by which representative gradation level each pixel should be reproduced. More specifically, if, as shown in FIG. 7A, "A" and "B" are employed as two representative gradation levels and a pattern consisting of "1" and "0" is given as resolution information, such codes are decoded into a block image such that "1" and "0" of the resolution information are replaced by the respective representative gradation levels. Conversely, in the coding operation, a block image may be converted to two representative gradation levels and resolution information that is a pattern consisting of "1" and "0" for respective pixels of the pixel block.

FIG. 7B shows an example of a code format of the block truncation coding method. Codes consist of a 1-bit identifier located at the head to identify the coding method, 7-bit information and 8-bit information respectively indicating representative gradation levels, and 64-bit resolution information. To make the total code length 80 bits (10 bytes), the representative gradation level (1) is expressed by 7 bits through quantization into 128 levels.

Figure 8A:
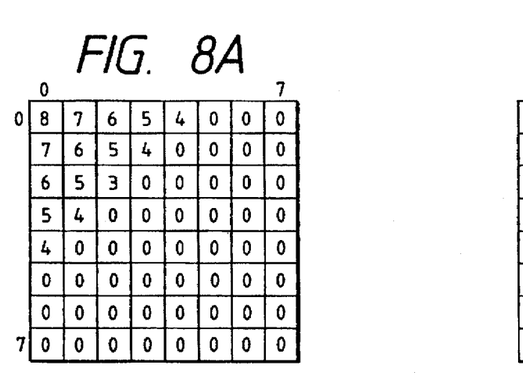
FIGS. 8A–8C illustrate an example of transform coding.
Figure 8B:
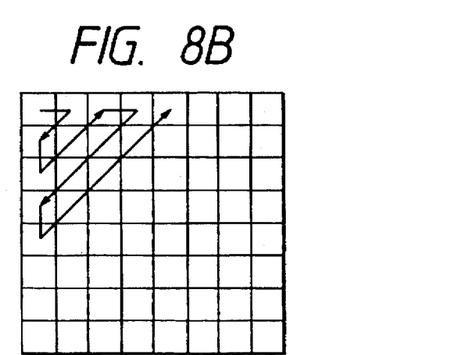
Figure 8C:
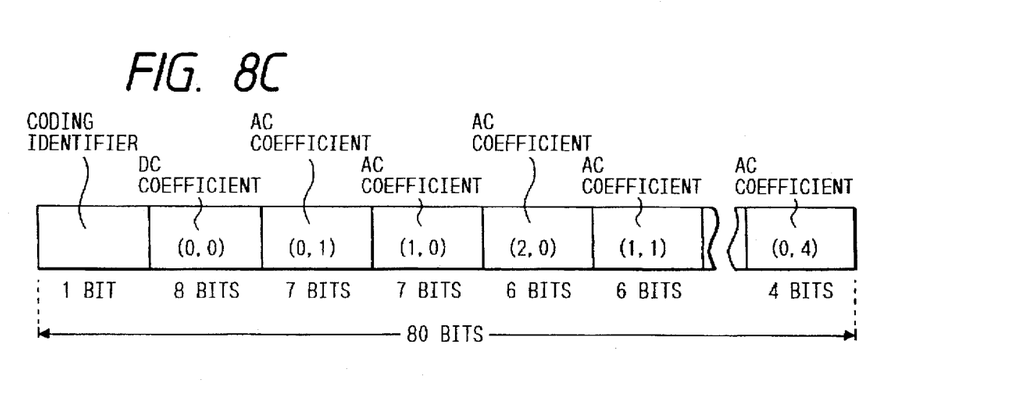

Next, a description will be made of the transform coding method. FIGS. 8A–8C illustrate an example of the transform coding method. After each pixel block is subjected to DCT, bits are allocated to transform coefficients according to a fixed bit allocation table shown in FIG. 8A. Each number shown in FIG. 8A is the number of bits to be allocated to a transform coefficient. In FIG. 8A, the total number of bits to be allocated, including one for a coding identifier, is set at 80, which is the same as in the block truncation coding method.

The bit-allocated transform coefficients are converted to a one-dimensional coefficient string according to a zigzagged path shown in FIG. 8B, and the one-bit coding identifier is added to the string at its head, to form codes. Since, as is well known, higher order components are not problematic in a decoding operation because of the nature of the DCT, they are omitted in this example. However, if the number of available bits is sufficiently large to accommodate higher order components, part of the available bits may be allocated to those components.

FIG. 8C shows an example of a coding format of DCT codes, which includes a 1-bit coding identifier and respective transform coefficients following it. The total number of bits is 80, which is the same as in the case of the block truncation coding method shown in FIG. 7B.

According to the above procedures, control can be made so as to always keep constant the code amounts of both cases where the DCT coding method and the block truncation coding method are applied. As a result, the size of a buffer for coded data and its transfer time can be fixed, to facilitate system designing. Further, since data is compressed to the fixed code amount on a pixel block basis, a particular location of an image can be detected from coded data. Therefore, simple editing operations such as cutting, moving and copying can be applied to the compressed data itself.

The block truncation coding method is not limited to the type of using two levels, but some other number of levels may be used. Further, the total code amount per block may be changed and the bit allocation may be adjusted accordingly. For example, similar advantages can be obtained by setting the total code amount in accordance with changes of the number of bits of each representative gradation level and the number of levels in the block truncation coding method, or changes of bits allocated to each transform coefficient and the number of transform coefficients in the transform coding method, and then determining the bit allocation accordingly.

Figure 9:
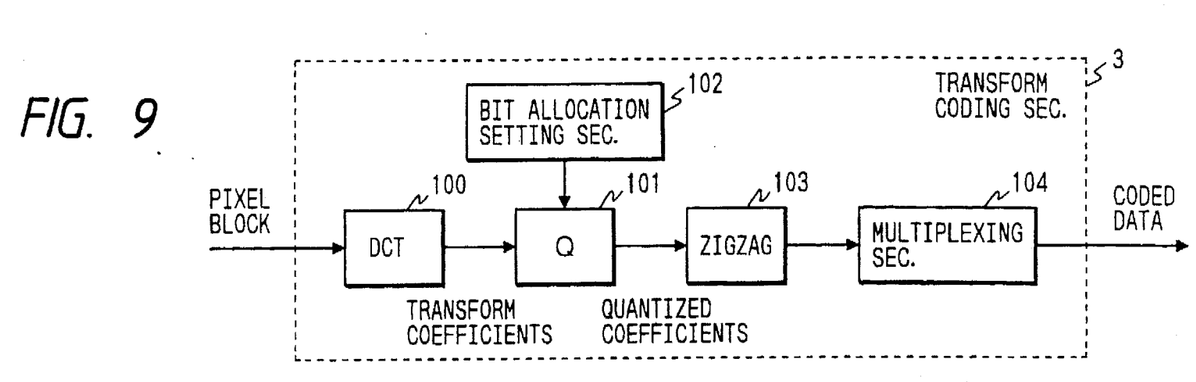
FIG. 9 is a block diagram showing an example of a transform coding section.

FIG. 9 shows a configuration of the transform coding section 3. In FIG. 9, a DC converting section 100 applies orthogonal transform to an input pixel block to produce transform coefficients. A quantizing section 101 quantizes the transform coefficients to produce quantized coefficients each having bits of a predetermined number. A bit allocation setting section 102 sets, in the manner as shown in FIG. 8A, the number of bits to be allocated to each quantized coefficient in the quantizing section 101. A scan converting section 103 converts the quantized coefficients to a one-dimensional string by scanning those in a zigzagged manner. A multiplexing section 104 constructs coded data by multiplexing, i.e., packing into a continuous bit string, the quantized coefficients that are input as the one-dimensional string.

Figure 10:
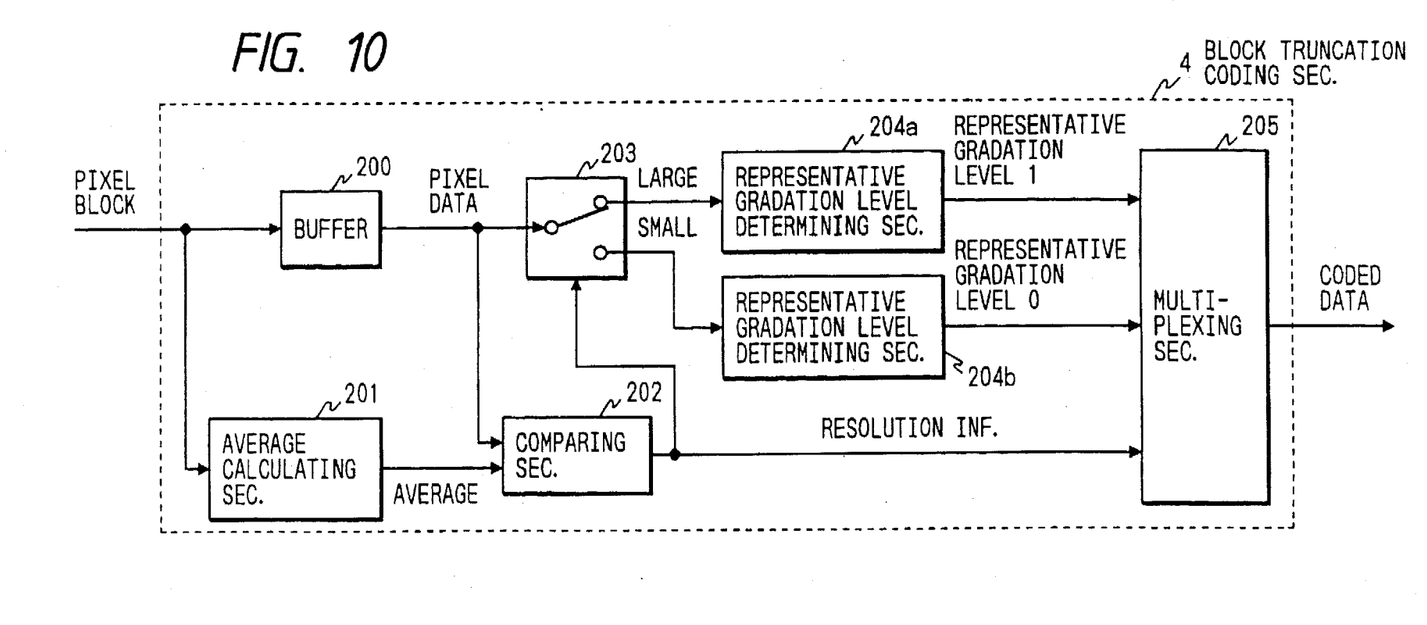
FIG. 10 is a block diagram showing an example of a block truncation coding section.

FIG. 10 shows a configuration of the block truncation coding section 4. In FIG. 10, a buffer 200 temporarily stores an input pixel block. An average calculating section 201 for calculating an average of pixel values of the input pixel block. A comparing section 202 compares pixel data as output from the buffer 200 with the calculated average, and outputs a comparison result as resolution information. In the case of binary block truncation coding, the comparing section 202 outputs "1" as the resolution information if the pixel data is larger than the average, and outputs "0" if it is smaller than the average. A switching section 203 switches the destination of the received pixel data in accordance with the resolution information as output from the comparing section 202. Based on the received pixel data, representative gradation level determining sections 204a and 204b determine representative gradation levels for the respective pixel groups as separated by the switching section 203. The representative gradation level may be an average, an ordinary value or a central value of the pixel values belonging to the pixel group. A multiplexing section 205 constructs coded data by multiplexing the representative gradation levels and the resolution information. Since the number of bits to be allocated to each of the representative gradation levels and the resolution information can be determined in accordance with the number of representative gradation levels, it is possible to always keep the size of the coded data constant.

An image coding apparatus according to a second embodiment of the invention will be described with reference to FIGS. 11–14.

Figure 11:
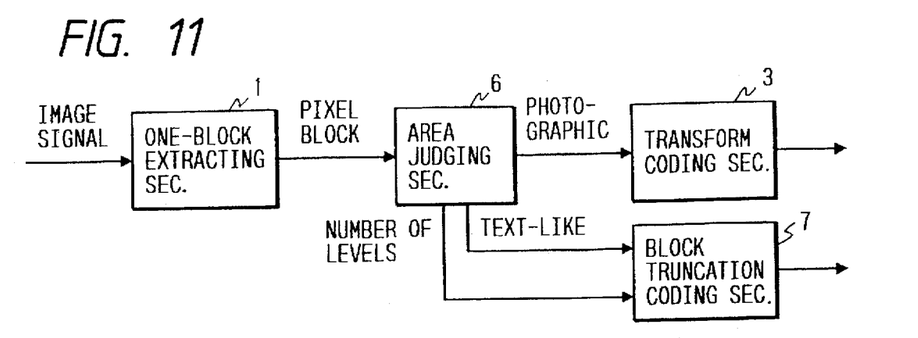
FIG. 11 is a block diagram showing an image coding apparatus according to a second embodiment of the invention.

FIG. 9 is a block diagram showing a configuration of the image coding apparatus according to the second embodiment. The parts in FIG. 9 that are similar to the corresponding parts in FIG. 1 are given the same reference numerals, and descriptions therefor are omitted here. Reference numerals 6 and 7 denote an area judging section and a block truncation coding section, respectively. The second embodiment is different from the first embodiment of FIG. 1 in that the area judging section 6 and the block truncation coding section deals with information indicating the number of levels of block truncation coding. When the area judging section 6 has judged that an extracted pixel block is text-like, it supplies the block truncation coding section 7 with the information indicating the number of levels of the block truncation coding as well as the pixel block. The block truncation coding section 7 codes the received pixel block with the number of levels thus specified.

Coded data as output from the transform coding section 3 and the block truncation coding section 7 may have respective formats that are basically similar to those in the first embodiment. However, since the block truncation coding is effected with a larger number of levels, the code format needs to have representative gradation levels of the same number as the number of levels. Further, a plurality of code formats may be used, and a coding identifier may be so constructed as to indicate an associated code format.

Figure 12:
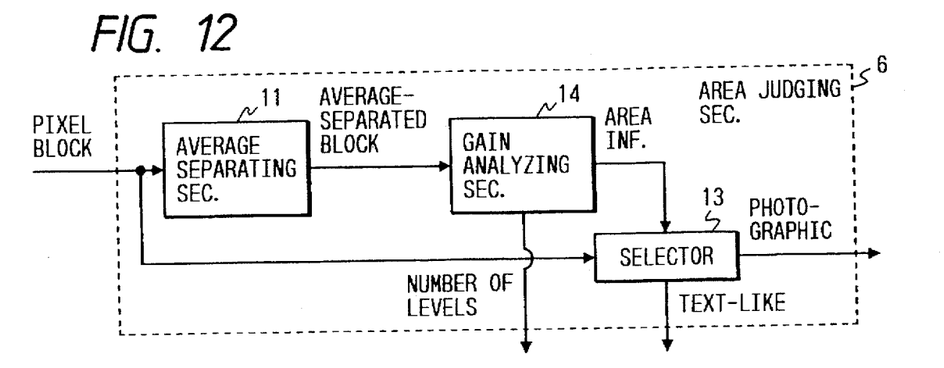
FIG. 12 is a block diagram showing an example of an area judging section.

FIG. 12 is a block diagram showing an example of the area judging section 6. The parts in FIG. 12 that are similar to the corresponding parts in FIG. 2 are given the same reference numerals, and descriptions therefor are omitted here. Reference numeral 14 denotes a gain analyzing section. The area judging section of FIG. 12 is different from the area judging section 5 of FIG. 2 in that when the gain analyzing section 14 has judged that the block is text-like or intermediate, it outputs the information indicating the number of levels of the block truncation coding in addition to the area information that has been produced by analyzing the gain information of the average-separated block.

Figure 13:
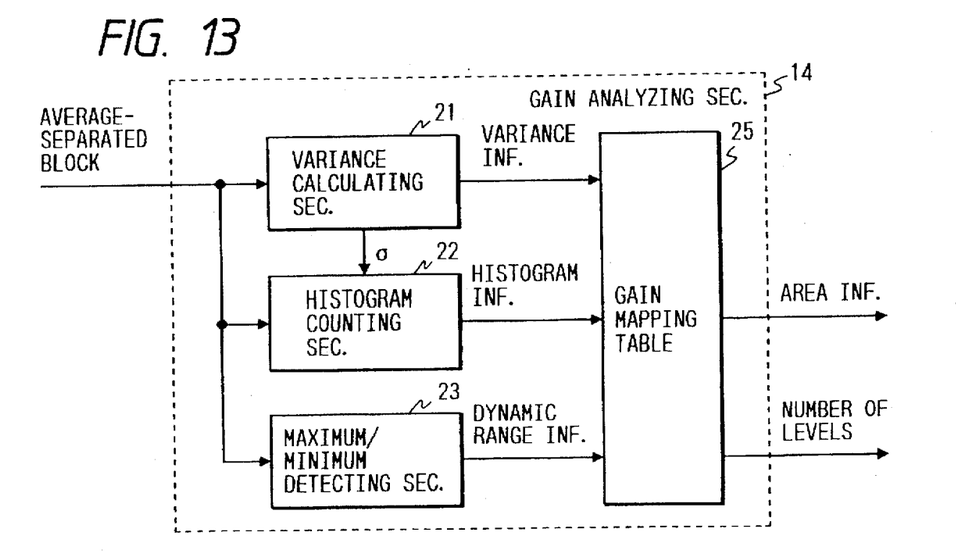
FIG. 13 is a block diagram showing an example of a gain analyzing section.

FIG. 13 is a block diagram showing an example of the gain analyzing section 14. The parts in FIG. 13 that are similar to the corresponding parts in FIG. 3 are given the same reference numerals, and descriptions therefor are omitted here. Reference numeral 25 denotes a gain mapping table. The gain analyzing section 14 of FIG. 13 is different from the gain analyzing section 12 of FIG. 3 in that the gain mapping table 25 determines the number of levels of the block truncation coding as well as performs the area judgment based on the variance information, histogram information and dynamic range information. The gain mapping table 25 has judging section that perform respective judgments based on the histogram information, variance information and dynamic information, and each judging section has a plurality of thresholds to be used for judging which one of three states a subject pixel block comes under. If the pixel block is judged to come under an intermediate state, the gain mapping table 25 supplies the block truncation coding section 7 with information indicating such a number of levels as causes the block truncation coding section to code the pixel block with fine gradation levels.

Figure 14:
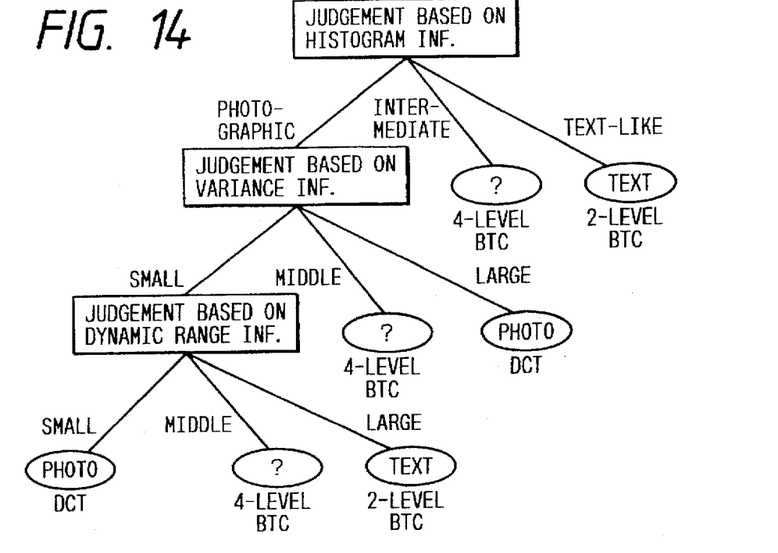
FIG. 14 is a chart illustrating how an area judgment is performed in the second embodiment.

FIG. 14 illustrates the area judgment performed in the image coding apparatus according to the second embodiment. The judgment procedure and method shown in FIG. 14 are similar to those of the binary tree type judgment shown in FIG. 6. The process of FIG. 14 is different from that of FIG. 6 in that an intermediate state is set between the judgment results of being text-like and photographic. A pixel block of the intermediate state occurs, for instance, when characters are incorporated into a photograph region. In the example of FIG. 14, 4-level block truncation coding is applied to intermediate pixel blocks to satisfy high resolution and superior gradation reproduction performance at the same time.

First, based on the histogram information output from the histogram counting section 22, it is judged whether a subject pixel block is text-like, photographic or intermediate. If the pixel block is judged to be text-like, "2" is output as the number of levels as well as a judgment result of being text-like, to reproduce character boundaries. In response, the block truncation coding section 7 performs the 2-level block truncation coding. If the pixel block is judged to be intermediate, "4" is output as the number of levels. In response, the block truncation coding section 7 performs the 4-level block truncation coding. If the pixel block is judged to be photographic, then a judgment based on the variance information is performed as follows.

If the variation information as output from the variance calculating section 21 is large, the pixel block is judged to be photographic, and subjected to the transform coding in the transform coding section 3. If the variance information has an intermediate value, the pixel block is judged to be an intermediate image, and subjected to the 4-level block truncation coding. If the variance information is small, the following judgment is performed because there is a possibility that the pixel block is text-like.

If the dynamic range information as output from the maximum/minimum detecting section 23 is large, the pixel block is judged to be text-like, and subjected to the 2-level block truncation coding. If the dynamic range information has an intermediate value, the pixel block is judged to be an intermediate image, and subjected to the 4-level block truncation coding. If the dynamic range information is small, the pixel block is judged to be photographic, and subjected to the transform coding.

As described above, the 4-level block truncation coding is performed when a pixel block is judged to be an intermediate image in each of the above judgment. As a result, an intermediate image such as a mixture of characters and a photograph can also be coded properly. The numbers of levels of the block coding are not limited to the combination of 2 and 4, but a larger number of levels may be employed for an intermediate pixel block. Further, the number of intermediate states between the judgment results of being text-like and photographic is not limited to one, but may be two or more number.

Figure 15:
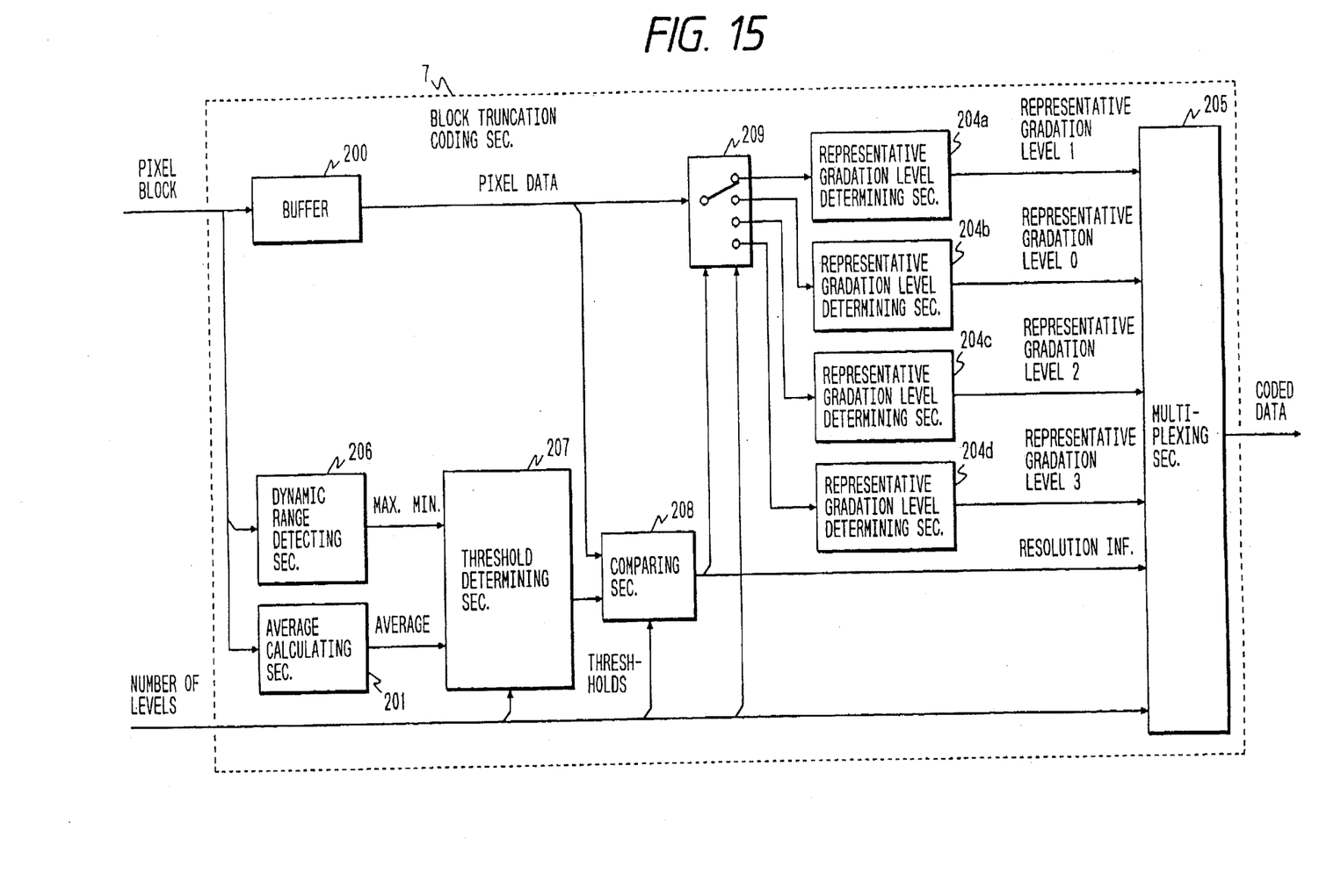
FIG. 15 is a block diagram showing an example of a block truncation coding section.

FIG. 15 shows a configuration of the block truncation coding section 7. The parts in FIG. 15 that are similar to the corresponding parts in FIG. 10 are given the same reference numerals. As described above, the block truncation coding section 7 performs the 2-level and 4-level block truncation coding operations. The parts in FIG. 15 relating to the 2-level block truncation coding are given the same reference numerals as the corresponding parts in FIG. 10, and descriptions therefor are omitted here.

A dynamic range detecting section 206 detects and outputs a maximum and a minimum of an input pixel block. A threshold determining section 207 determines quantization thresholds based on the number of levels as determined by the area judging section 6 (see FIG. 11). A comparing section 208 compares pixel data with the thresholds thus determined, and outputs resolution information of accuracy corresponding to the number of levels. A switching section 209 switches the destination of the received pixel data based on the number of levels and the resolution information as output from the comparing section 208. Each of representative gradation level determining sections 204a–204d determines a representative gradation level based on the received pixel data.

The buffer 200 temporarily stores the input pixel block, and an average calculating section 201 calculates an average of pixel values of the pixel block. Further, the dynamic range detecting section 206 detects the maximum and minimum of the pixel values.

The threshold determining section 207 determines a plurality of thresholds based on the information indicating the number of levels supplied from the area judging section 6 (see FIG. 11). If the number of levels is 2, the average as output from the average calculating section 201 is employed as the threshold, as in the case of the first embodiment. If the number of levels is 4, three thresholds to be used for sorting the pixel values into four levels are determined based on the maximum and minimum as output from the dynamic range detecting section 206. For example, the three thresholds are selected so as to equally divide the interval between the maximum and minimum into four sections.

The processing in the comparing section 208 is switched based on the information indicating the number of levels supplied from the area judging section 6. If the number of levels is 2, the comparing section 208 compares the pixel data with the threshold as output from the threshold determining section 207, and outputs a comparison result as 1-bit resolution information. If the number of levels is 4, the comparing section 208 compares the pixel data with the three thresholds as output from the threshold determining section 207, and outputs comparison results as 2-bit resolution information.

If the number of levels is 2, the switching section 209 switches the destination of the pixel data between the two representative gradation level determining sections 204a and 204b in accordance with the 1-bit resolution information. If the number of levels is 4, the switching section 209 switches the destination of the pixel data between the four representative gradation level determining sections 204a–204d in accordance with the 2-bit resolution information.

Finally, the multiplexing section 205 constructs coded data by multiplexing the number of levels of the block truncation coding, the representative gradation levels and the resolution information.

Figure 16A:
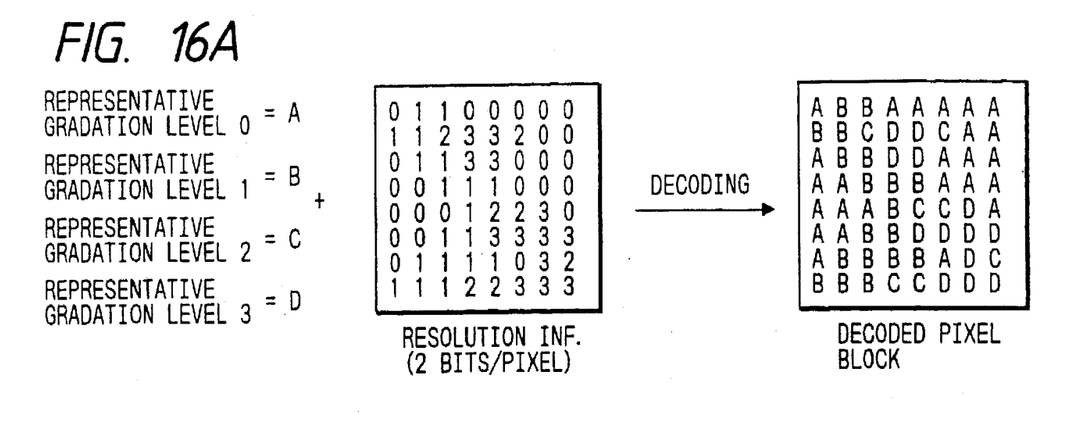
FIGS. 16A and 16B illustrate an example of 4-level block truncation coding.
Figure 16B:
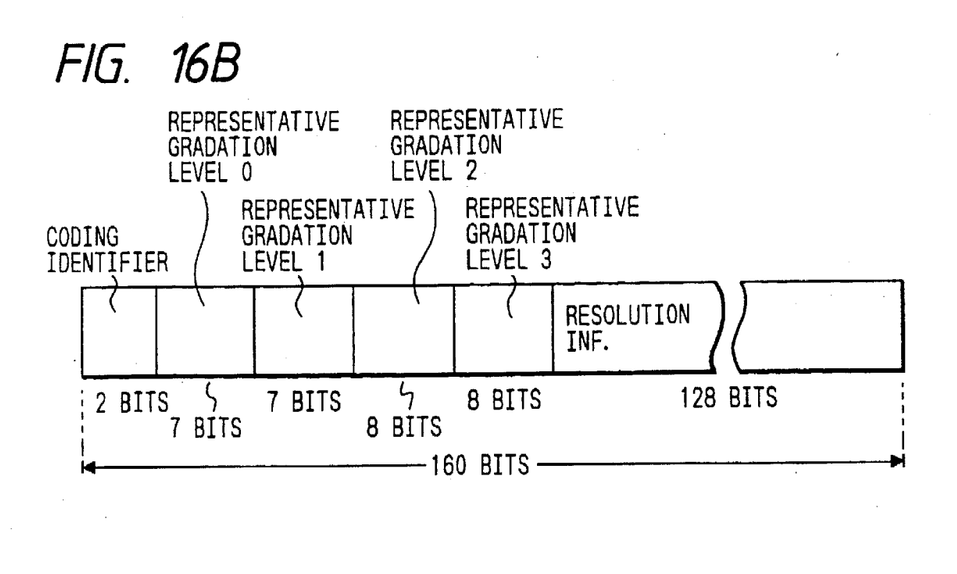

FIGS. 16A and 16B illustrate an example of the 4-level block truncation coding method. In FIG. 16B, a 2-bit coding identifier at the head of codes indicates whether the transform coding or block truncation coding has been performed and the number of levels of the block truncation coding. It is noted that 2 bits are also allocated to the coding identifier of the coded data produced by the transform coding section 3.

To make the code amount of the 4-level block truncation coding 80 bits, i.e., the same amount as in the other coding operations, the following bit allocation may be employed. That is, the coding operation is performed such that the resolution information is thinned out at a rate of 2:1 both horizontally and vertically, 4×8=32 bits are allocated to the four representative gradation levels, and 2 bits are allocated to the coding identifier. Further, 16 filling bits are added to the above 64-bit coded data.

In the first and second embodiments described above, the respective coding methods for photographic and text-like pixel blocks are not limited to those described. In the second embodiment, the coding method for an intermediate block image is not limited to the block coding but may be the transform coding or other types of coding. Further, where pixel blocks are classified into three or more types as in the case of the second embodiment, three or more coding methods may be employed.

As described above, according to the invention, in coding an image signal on a pixel block basis, the characteristic quantities such as the variance information, histogram information and dynamic range information are calculated on a pixel block basis, and then it is judged whether each pixel block is a text-like image which contains an edge or a photographic image which does not contain an edge. As a result, the judgment accuracy is improved and it becomes possible to correctly code, as a text-like block, such blocks as a block containing an edge having a small level difference as in the case of a color image and a block containing only a slight portion of an edge, thus enabling the image quality to be improved. In particular, better adaptive coding can be realized by calculating a plurality of characteristic quantities and performing the judgment as to the type of a pixel block in a closer manner.

As another advantage of the invention, by setting coding parameters so as to equalize the respective code amounts of each block of a plurality of coding methods such as the DCT coding and the block truncation coding, the system design can be simplified and it becomes possible to perform editing operations on coded data itself.

What is claimed is:

1. An image coding apparatus comprising:

one-block extracting means for extracting, from an image signal, a pixel block containing m×n pixels, where m and n are positive integers;

a plurality of coding means for coding the pixel block;

means for adding to the pixel block information indicating a coding method; and area judging means for analyzing a plurality of characteristic quantities of the pixel block and for supplying the pixel block to one of the plurality of coding means in accordance with a result of the analysis, the plurality of characteristic quantities being measured in statistically different aspects, further, said area judging means comprising:

average separating means for subtracting from the pixel block, an average of values of pixels belonging to the pixel block to produce an average-separated block; and destination determining means for classifying the pixel blocks as one of a plurality of pixel block types by analyzing a histogram of values of the pixels within the average-separated block, a variance of the values of the pixels within the average-separated block and a result of comparison between maximum and minimum values of pixels within the average-separated block, the block types including a text-like block type and a photographic block type; and said destination determining means supplying the pixel block to one of the plurality of coding means according to a result of the classification.

2. The image coding apparatus of claim 1, wherein said plurality of coding means include a first coding means for coding a text-like pixel block by block truncation coding, and a second coding means for coding a photographic pixel block by transform coding.

3. The image coding apparatus of claim 2, wherein said plurality of block types further include an intermediate block type, and said area judging means further comprises means for producing information indicating the number of levels of the second coding means when the destination determining means has judged that the pixel block comes under the text-like block type or the intermediate block type.

4. The image coding apparatus of claim 2, wherein coding parameters of said plurality of coding means are set so that said plurality of coding means produce respective coded data having the same code amount per pixel block.

5. The image coding apparatus of claim 4, wherein said first coding means comprises:

means for coding the pixel block by transform coding to produce transform coefficients;

means for quantizing the transform coefficients to produce quantized transform coefficients having respective predetermined numbers of bits that are determined so as to sum up to a predetermined number; and means for multiplexing means for packing the quantized transform coefficients into a continuous data string.

6. The image coding apparatus of claim 4, wherein second coding means comprises:

a buffer for storing the image signal;

means for determining, in accordance with the pixel values, a threshold or thresholds to be used for separating the pixel values into a plurality of groups on a pixel block basis;

means for determining which one of the groups each pixel belongs to by comparing each pixel value with the threshold or thresholds, and for producing resolution information indicating which one of the groups each pixel belongs to;

means for determining representative gradation levels of the respective groups; and means for multiplexing the resolution information and the representative gradation levels;

wherein a total number of bits of the resolution information and the representative gradation levels is set at a predetermined number.

7. The image coding apparatus of claim 5, wherein said quantizing means comprises means for setting the respective predetermined numbers of bits of the transform coefficients.

* * * * *

UNITED STATES PATENT AND TRADEMARK OFFICE
CERTIFICATE OF CORRECTION

PATENT NO. : 5,742,704
DATED : April 21, 1998
INVENTOR(S) : Kazuhiro SUZUKI et al.

It is certified that error appears in the above-identified patent and that said Letters Patent is hereby corrected as shown below:

Claim 1, column 12, line 64, after "pixel block", insert --,--.

Signed and Sealed this

Ninth Day of March, 1999

Attest:

Q. TODD DICKINSON

*Attesting Officer*     *Acting Commissioner of Patents and Trademarks*